US008296223B2

(12) United States Patent
Breeden, Jr. et al.

(10) Patent No.: US 8,296,223 B2
(45) Date of Patent: Oct. 23, 2012

(54) SYSTEM AND METHOD FOR PROCESSING DUPLICATIVE ELECTRONIC CHECK REVERSAL FILES

(75) Inventors: Benjamin T. Breeden, Jr., Eldersburg, MD (US); Steven D. Martin, Parma, OH (US); Timothy Rachek, Chagrin Falls, OH (US); Randall Lee Mueller, Kansas City, MO (US); V. Srinivas Nori, Norcross, GA (US); Daniel A. Maslaney, Norcross, GA (US)

(73) Assignees: Federal Reserve Bank of Atlanta, Atlanta, GA (US); Federal Reserve Bank of Cleveland, Cleveland, OH (US); Federal Reserve Bank of Richmond, Richmond, VA (US); Federal Reserve Bank of Kansas City, Kansas City, MO (US)

( * ) Notice: Subject to any disclaimer, the term of this patent is extended or adjusted under 35 U.S.C. 154(b) by 851 days.

(21) Appl. No.: 11/982,923

(22) Filed: Nov. 6, 2007

(65) Prior Publication Data

US 2008/0162319 A1 Jul. 3, 2008

Related U.S. Application Data

(60) Provisional application No. 60/857,666, filed on Nov. 7, 2006.

(51) Int. Cl.
G06Q 40/00 (2006.01)
(52) U.S. Cl. ............................. 705/38; 705/36 R; 705/35
(58) Field of Classification Search .................... 705/38
See application file for complete search history.

(56) References Cited

U.S. PATENT DOCUMENTS

| | | | |
|---|---|---|---|
| 4,264,808 A | 4/1981 | Owens et al. |
| 4,270,042 A | 5/1981 | Case |
| 4,523,330 A | 6/1985 | Cain |
| 4,694,397 A | 9/1987 | Grant et al. |
| 4,823,264 A | 4/1989 | Deming |
| 4,948,174 A | 8/1990 | Thomson et al. |
| 4,974,878 A | 12/1990 | Josephson |
| 5,038,283 A | 8/1991 | Caveney |
| 5,120,944 A | 6/1992 | Kern et al. |
| 5,121,945 A | 6/1992 | Thomson et al. |
| 5,187,750 A | 2/1993 | Behera |
| 5,198,975 A | 3/1993 | Baker et al. |
| 5,237,159 A | 8/1993 | Stephens et al. |
| 5,265,007 A | 11/1993 | Barnhard et al. |
| 5,373,550 A | 12/1994 | Campbell et al. |

(Continued)

OTHER PUBLICATIONS

Excerpt of Bank of America checking account statement, with personal information redacted, Aug. 2008.

(Continued)

*Primary Examiner* — Kirsten Apple
(74) *Attorney, Agent, or Firm* — King & Spalding

(57) ABSTRACT

Processing duplicate items in image cash letter ("ICL") reversal files for efficient handling. A duplicate item processing module can receive ICL reversal files comprising items representing duplicate electronic checks. The duplicate item processing module can determine whether the processing entity erroneously presented the item more than once. The duplicate item processing module can also determine whether the depositing institution erroneously deposited the item more than once for processing. Based on the determination of the source of the error, the duplicate item processing module can make a correction in its own records and/or forward the ICL reversal file with the duplicate item to the receiving institution.

8 Claims, 5 Drawing Sheets

U.S. PATENT DOCUMENTS

| | | | |
|---|---|---|---|
| 5,412,190 A | 5/1995 | Josephson et al. | |
| 5,583,759 A | 12/1996 | Geer | |
| 5,600,732 A | 2/1997 | Ott et al. | |
| 5,668,897 A | 9/1997 | Stolfo | |
| 5,677,955 A | 10/1997 | Doggett et al. | |
| 5,680,611 A | 10/1997 | Rail et al. | |
| 5,687,250 A | 11/1997 | Curley et al. | |
| 5,689,579 A | 11/1997 | Josephson | |
| 5,692,065 A | 11/1997 | Prakash et al. | |
| 5,754,674 A | 5/1998 | Ott et al. | |
| 5,783,808 A | 7/1998 | Josephson | |
| 5,790,717 A | 8/1998 | Judd | |
| 5,819,236 A | 10/1998 | Josephson | |
| 5,832,140 A | 11/1998 | Stapleton et al. | |
| 5,930,778 A | 7/1999 | Geer | |
| 5,937,084 A | 8/1999 | Crabtree et al. | |
| 5,940,524 A | 8/1999 | Murayama et al. | |
| 5,963,654 A | 10/1999 | Prakash et al. | |
| 6,019,282 A | 2/2000 | Thompson et al. | |
| 6,097,834 A | 8/2000 | Krouse et al. | |
| 6,115,509 A | 9/2000 | Yeskel | |
| 6,170,744 B1 | 1/2001 | Lee et al. | |
| 6,236,756 B1 | 5/2001 | Kimura et al. | |
| 6,243,689 B1 | 6/2001 | Norton | |
| 6,351,546 B1 | 2/2002 | Murayama et al. | |
| 6,351,553 B1 | 2/2002 | Hayosh | |
| 6,450,403 B1 | 9/2002 | Martens et al. | |
| 6,571,000 B1 | 5/2003 | Rasmussen et al. | |
| 6,577,761 B1 | 6/2003 | Kanno et al. | |
| 6,585,775 B1 | 7/2003 | Cosentino et al. | |
| 6,658,139 B1 | 12/2003 | Cookingham et al. | |
| 6,717,592 B2 | 4/2004 | Gusler et al. | |
| 6,792,133 B2 | 9/2004 | Ott et al. | |
| 6,850,950 B1 | 2/2005 | Clarke et al. | |
| 6,854,656 B2 | 2/2005 | Matsumori | |
| 6,912,297 B2 | 6/2005 | Scott et al. | |
| 6,963,885 B2 | 11/2005 | Calkins et al. | |
| 6,996,263 B2 | 2/2006 | Jones et al. | |
| 7,000,828 B2 | 2/2006 | Jones | |
| 7,066,668 B2 | 6/2006 | Sandison et al. | |
| 7,066,669 B2 | 6/2006 | Lugg | |
| 7,082,216 B2 | 7/2006 | Jones et al. | |
| 7,092,560 B2 | 8/2006 | Jones et al. | |
| 7,099,845 B2 | 8/2006 | Higgins et al. | |
| 7,120,606 B1 | 10/2006 | Ranzini et al. | |
| 7,167,580 B2 | 1/2007 | Klein et al. | |
| 7,283,656 B2 | 10/2007 | Blake et al. | |
| 7,386,511 B2* | 6/2008 | Buchanan et al. | 705/45 |
| 7,539,646 B2* | 5/2009 | Gilder et al. | 705/44 |
| 7,546,275 B1 | 6/2009 | Herzberg et al. | |
| 2001/0039534 A1 | 11/2001 | Keene | |
| 2001/0051921 A1 | 12/2001 | Garner et al. | |
| 2002/0150279 A1 | 10/2002 | Scott et al. | |
| 2003/0158811 A1 | 8/2003 | Sanders et al. | |
| 2003/0202690 A1 | 10/2003 | Jones et al. | |
| 2003/0208421 A1 | 11/2003 | Vicknair | |
| 2003/0225704 A1 | 12/2003 | Park et al. | |
| 2004/0030621 A1 | 2/2004 | Cobb | |
| 2004/0068464 A1 | 4/2004 | Buchanan et al. | |
| 2004/0109596 A1 | 6/2004 | Doran | |
| 2004/0133516 A1 | 7/2004 | Buchanan et al. | |
| 2004/0143621 A1 | 7/2004 | Fredrickson et al. | |
| 2004/0148235 A1 | 7/2004 | Craig et al. | |
| 2004/0181485 A1 | 9/2004 | Finch | |
| 2004/0218203 A1 | 11/2004 | Mastie et al. | |
| 2004/0236688 A1 | 11/2004 | Bozeman | |
| 2005/0018896 A1 | 1/2005 | Heit et al. | |
| 2005/0044043 A1 | 2/2005 | Gooding et al. | |
| 2005/0071283 A1 | 3/2005 | Randle et al. | |
| 2005/0080719 A1 | 4/2005 | Sellen et al. | |
| 2005/0080738 A1 | 4/2005 | Sellen et al. | |
| 2005/0086136 A1 | 4/2005 | Love et al. | |
| 2005/0097046 A1 | 5/2005 | Singfield | |
| 2005/0097050 A1 | 5/2005 | Orcutt | |
| 2005/0109833 A1 | 5/2005 | Page | |
| 2005/0129300 A1 | 6/2005 | Sandison et al. | |
| 2005/0139670 A1 | 6/2005 | McGlamery | |
| 2005/0144131 A1 | 6/2005 | Aziz | |
| 2005/0171899 A1* | 8/2005 | Dunn et al. | 705/39 |
| 2005/0175221 A1 | 8/2005 | Scott et al. | |
| 2005/0203857 A1 | 9/2005 | Friedman | |
| 2005/0211763 A1 | 9/2005 | Sgambati et al. | |
| 2005/0213805 A1 | 9/2005 | Blake et al. | |
| 2005/0220324 A1 | 10/2005 | Klein et al. | |
| 2005/0238252 A1 | 10/2005 | Prakash et al. | |
| 2005/0243378 A1 | 11/2005 | Klein et al. | |
| 2005/0243379 A1 | 11/2005 | Klein et al. | |
| 2005/0244035 A1 | 11/2005 | Klein et al. | |
| 2005/0252960 A1 | 11/2005 | Murata | |
| 2005/0256839 A1 | 11/2005 | Leong et al. | |
| 2005/0281448 A1 | 12/2005 | Lugg | |
| 2006/0006222 A1 | 1/2006 | Brey et al. | |
| 2006/0023930 A1 | 2/2006 | Patel et al. | |
| 2006/0045321 A1 | 3/2006 | Yu | |
| 2006/0045600 A1 | 3/2006 | Lugg | |
| 2006/0080245 A1 | 4/2006 | Bahl et al. | |
| 2006/0106717 A1 | 5/2006 | Randle et al. | |
| 2006/0112013 A1 | 5/2006 | Maloney | |
| 2006/0118613 A1 | 6/2006 | McMann et al. | |
| 2006/0133277 A1 | 6/2006 | Carozza | |
| 2006/0167784 A1 | 7/2006 | Hoffberg | |
| 2006/0182331 A1 | 8/2006 | Gilson et al. | |
| 2006/0182332 A1 | 8/2006 | Weber | |
| 2006/0184441 A1 | 8/2006 | Haschka et al. | |
| 2006/0186194 A1 | 8/2006 | Richardson et al. | |
| 2006/0188310 A1 | 8/2006 | Sandison et al. | |
| 2006/0188311 A1 | 8/2006 | Lugg | |
| 2006/0191998 A1 | 8/2006 | Mueller et al. | |
| 2006/0206427 A1 | 9/2006 | Love et al. | |
| 2006/0212391 A1* | 9/2006 | Norman et al. | 705/40 |
| 2006/0229987 A1 | 10/2006 | Leekley | |
| 2006/0237526 A1* | 10/2006 | Mueller et al. | 235/379 |
| 2006/0248009 A1* | 11/2006 | Hicks et al. | 705/40 |
| 2006/0280354 A1 | 12/2006 | Murray | |
| 2007/0095888 A1 | 5/2007 | Mueller et al. | |
| 2007/0100672 A1 | 5/2007 | McBrida et al. | |
| 2007/0156438 A1 | 7/2007 | Popadic et al. | |
| 2007/0235518 A1 | 10/2007 | Mueller et al. | |
| 2007/0244782 A1 | 10/2007 | Chimento | |
| 2007/0288382 A1 | 12/2007 | Narayanan et al. | |
| 2008/0006687 A1 | 1/2008 | Mueller et al. | |
| 2008/0097899 A1 | 4/2008 | Jackson et al. | |
| 2008/0103790 A1 | 5/2008 | Abernethy et al. | |
| 2008/0159655 A1 | 7/2008 | Breeden et al. | |
| 2008/0162320 A1 | 7/2008 | Mueller et al. | |
| 2008/0162321 A1 | 7/2008 | Breeden et al. | |
| 2008/0162322 A1 | 7/2008 | Breeden | |
| 2008/0247629 A1 | 10/2008 | Gilder et al. | |

OTHER PUBLICATIONS

"Vision, Strategy & Approach to Image Quality & Archive Integrity, a Review of Carreker's Current Initiatives Towards Image Quality Detection & Resolution", Federal Reserve System, Aug. 19, 2003, Copyright © 2003 Carreker Corporation, pp. 1-43.

"Image Exchange Suite, Image Enabling Check Presentment", Federal Reserve System, Aug. 19, 2003, Copyright © 2003 Carreker Corporation, pp. 1-11.

"Image Inspector Questions", from presentation dated Jul. 2003, pp. 1-2.

"FRB Check 21 Project, Federal Reserve Financial Services, Carreker Requirements Response", Nov. 18, 2003, Copyright © 2002 Carreker Corporation, pp. 1-18.

"FRB Check 21 Project, Federal Reserve Financial Services, Additional Carreker Proposals", Nov. 18, 2003, Copyright © 2002 Carreker Corporation, pp. 1-30.

"SortLogic Systems Ushers in New Electronic Banking Era with Virtual Capture Solution for Check Image Exchange", Apr. 7, 2005, SortLogic Systems, a Division of Omni-Soft, Inc., pp. 1-2.

"BancTec Unveils Image Quality Assurance Suite", Feb. 16, 2004, BancTec, Inc., http://www.banctec.com/PressRelease.cfm?PRID=174, pp. 1-3.

"What is Check 21?", VSOFT Corporation, available at http://www.vsoftcorp.com/check21.htm.

"Check21 Cash Letter: Clear Check Images Rather than Paper Checks", SYMITAR, available at http://www.symitar.com/Default.aspx?P=2d1883d0-91be-496d-9047-64a83378dd36.

"Creating, Editing and Using Image Cash Letter, X9.37 Files", All My Papers, available at http://www.ggx.com/solutions_7.htm.

Holcomb, Notice 04-57, Aug. 27, 2004, Federal Reserve Bank of Dallas, 6 pages.

Microsoft Computer Dictionary, Fifth Edition, Microsoft Press, Copyright 2002, p. 258, 3 pages.

"CONIX Systems Launches Dupe Detective: New Product Eliminates Cost and Liability of Processing Items Multiple Times", Business Wire, May 18, 2006, 3 pages.

"Alogent Offering Sierra Solution for Image Cash Letter Deposits: Image Cash Letter and Back Office Conversion Capabilities Optimized for Large Merchants and Correspondent Banks", Business Wire, Oct. 10, 2005, p. 1, 2 pages.

"Taking Control of Payment Duplication: An In-Depth Look at a Serious Challenge Created by Check 21", Conix Systems, Inc., White Papers, Sep. 8, 2006, Retrieved Feb. 3, 2009, http://www.conix.com/news/default.asp, 9 pages.

Greene, U.S. Appl. No. 11/482,379, Office Action, Sep. 30, 2009, 29 pages.

Greene, U.S. Appl. No. 11/482,379, Office Action, Jun. 10, 2009, 8 pages.

Greene, U.S. Appl. No. 11/482,379, Office Action, Sep. 29, 2008, 5 pages.

Labaze, U.S. Appl. No. 11/482,360, Office Action, Sep. 23, 2009, 8 pages.

Captovation Announces the Release of Check Capture 5.1: Newest Version of Check Imaging Software Includes Features to Facilitate Electronic Check Exchange and Presentment, Business Wire; New York, Aug. 10, 2006. p. 1, last accessed May 9, 2010, available online.

3.Next Stop: image exchange?, ABA Banking Journal (0194-5947), 2003. vol. 95, Issue 11, p. 10.

"All My Papers tm, Creating Editing and Using Image Cash Letter. X9.37 Files." http://replay.web.archive.org/20060519041745/http://www.ggx.com/solutions_7.htm> retrieved Apr. 26, 2011 (6 pages).

* cited by examiner

US 8,296,223 B2

SYSTEM AND METHOD FOR PROCESSING DUPLICATIVE ELECTRONIC CHECK REVERSAL FILES

RELATED PATENT APPLICATIONS

This patent application claims priority under 35 U.S.C. §119 to U.S. Provisional Patent Application No. 60/857,666, entitled "Check Processing Using Substitute Check Images," filed Nov. 7, 2006, the complete disclosure of which is hereby fully incorporated herein by reference. This patent application is also related to co-pending U.S. patent application Ser. No. 11/983,034, entitled "Automated Return Item Re-Clear," filed Nov. 6, 2007, U.S. patent application Ser. No. 11/983,033, entitled "Systems and Methods for Preventing Duplicative Check Processing," filed Nov. 6, 2007, U.S. patent application Ser. No. 11,983,033, entitled "Prioritizing Checks for Electronic Check Processing," filed Nov. 6, 2007, and U.S. patent application Ser. No. 11,983,032, entitled "System and Method for Processing Duplicative Electronic Check Return Files," filed Nov. 6, 2007. The complete disclosure of all of the foregoing related applications is hereby fully incorporated herein by reference.

FIELD OF THE INVENTION

The invention relates generally to processing duplicative electronic checks and more particularly to processing reversal files efficiently so that duplicative electronic checks can be accurately corrected.

BACKGROUND OF THE INVENTION

Effective Oct. 28, 2004, the Check Clearing for the 21st Century Act ("the Act") improved the ability of banks to use electronic images of paper checks by, for example, submitting those images, along with associated information, for electronic processing. Under the Act, if a receiving financial institution ("RI") or its customer requires a paper check, a paper image replacement document ("IRD"), such as a paper "substitute check," can be created from an electronic check image and associated electronic information. Such a substitute check meeting specified requirements is the legal equivalent of an original paper check, and an RI is required to accept the substitute check for payment. This process enables banks to reduce the costs and inconveniences associated with physically handling and transporting original paper checks.

Under the Act, the substitute check must be essentially an exact copy of the original paper check to be the legal equivalent of the original paper check. In particular, the substitute check must include an exact copy of all of the Magnetic Ink Character Recognition ("MICR") data provided on the original paper check and all check endorsements.

The terms "substitute check" and "IRD" generally are used interchangeably herein to refer to any electronic or paper document that can be used for electronic payment processing purposes, whether or not the document is the legal equivalent of a paper check negotiable instrument. The terms "bank," "customer," "RI," and "processing entity" generally are used herein to refer to any party performing conventional or electronic check processing at any stage, including depositing and receiving institutions, their non-bank subsidiaries and affiliates, and any non-bank third party agents that provide processing services to banks.

Typically, each electronic check is received for processing in an electronic image cash letter file (hereinafter an "ICL file"), which includes one or more electronic image cash letters ("ICLs"). Each ICL includes one or more bundles of items to be processed. Each bundle includes one or more items. The term "item" is used herein to refer to a check or an IRD or information that represents a check or an IRD. For a particular item, the ICL can include one or more electronic images of the item, the complete MICR data provided on the item, and additional financial data related to the item, such as endorsement information (hereinafter, "addenda data").

The ICL can further include a series of records related to the items. For example, for each bundle of items in the ICL, the ICL can include a bundle summary control record comprising information about the bundle, such as a bundle identification number, the number of items in the bundle, the value of each of the items in the bundle, and the total value of all the items in the bundle. The ICL also can include an ICL control record comprising information about the origin and destination of the ICL, and a cash letter bundle summary control record comprising a summary of all the bundle summary control records in the ICL. For simplicity, each ICL, bundle, item, image, record, or other component of an ICL file is referred to herein as an "element" of the ICL file.

In the traditional, paper processing arena, each check could be seen and touched throughout processing. Thus, in the traditional, paper processing arena, it was virtually impossible to process the same check twice. However, with electronic check processing, multiple banks are processing the same checks in an electronic environment. Because the banks are producing and processing electronic copies of the checks, the same check may be reproduced and processed two or more times. Thus, a check processor may receive duplicate ICL files and/or ICL file elements. Similarly, a check processor may produce and present duplicate ICL files and/or ICL file elements for payment. To date, banks have been unable to efficiently correct errors resulting from duplicative presentment of ICL files and/or ICL file elements. Thus, a need exists in the art for a system and method to improve the efficiency with which banks and check processors correct duplication errors relating to electronic checks.

SUMMARY OF THE INVENTION

The invention provides systems and methods for processing duplicate ICL files or duplicate elements of ICL files. In one embodiment, a depositing institution can transmit a reversal ICL file containing one or more reversal items to a check processing entity for processing the reversal item. The reversal item can represent a duplicate item where the depositing institution has determined that the item was deposited more than once. The check processing entity can use a check processing system and a duplicate item processing module to determine an efficient method for processing the reversal item. For example, the duplicate item processing module can compare the reversal item to a database of records of items the depositing institution previously deposited with the check processing entity. If the reversal item does not match more than one previously deposited item, the check processing entity can rely on the depositing institution's decision to send the reversal item in the first place and forward the reversal item to the receiving institution. If the reversal item matches more than one previously deposited item, the check processing entity can examine its check presentment records to determine whether the check processing entity has already recognized the duplication. If the check processing entity has not already recognized the duplication, the check processing entity can take actions to correct the duplication. If the check processing entity has already recognized the duplication, there is no need to forward the reversal item to the receiving institution and the check processing entity can terminate the reversal item.

In another embodiment, the invention provides a method for processing one or more reversal items in a reversal ICL file. The processing entity receives the reversal file containing the reversal item from a depositing institution. The processing entity can compare the reversal item to a record of items that the depositing institution has deposited with the processing entity. If the reversal item has not been deposited more than once, the processing entity can rely on the depositing institution's decision to send the reversal and the processing entity can forward the reversal item to the receiving institution. If, on the other hand, the reversal item has been deposited more than once previously with the processing entity, the processing entity can suspend the reversal item and determine whether a duplicate associated with the reversal item has already been identified. If the processing entity has already identified the duplicate item associated with the reversal item and suspended the duplicate item before sending it to the receiving institution, there is no need to transmit the reversal item to the receiving institution and the reversal item can be terminated. However, if the processing entity has not previously identified the duplicate item associated with the reversal item and the duplicate item has already been forwarded to the receiving institution, the processing entity can send the reversal file to the receiving institution to correct the associated duplicate item.

In yet another embodiment, the invention comprises a method for processing a reversal ICL file. The processing entity can compare the reversal ICL file to a record of previously deposited ICL files. If the processing entity identifies in the records of previously deposited ICL files a duplicate ICL file associated with the reversal ICL file, the processing entity can examine the record of outgoing ICL files presented to a receiving institution. If a duplicate ICL file associated with the reversal ICL file is identified in the record of previously presented ICL files, the processing entity can forward the reversal ICL to the receiving institution to correct the duplication. On the other hand, if a duplicate of the reversal file appears in the record of deposited ICL files, but not in the record of presented ICL files, the processing entity can suspend the reversal ICL file for further examination. Further examination may show that the processing entity has already terminated the duplicate ICL file or is in the process of handling the duplicate ICL file. In these situations, the processing entity can terminate the duplicate ICL file before it is presented to the receiving institution and can also terminate the reversal ICL file.

These and other aspects, objects, features, and advantages of the invention will become apparent to a person skilled in the art upon consideration of the following detailed description of illustrated exemplary embodiments, which include the best mode of carrying out the invention as presently perceived.

DETAILED DESCRIPTION OF EXEMPLARY EMBODIMENTS

The invention is directed to systems and methods for processing checks under the Act. In particular, the invention is directed to monitoring the processing status of electronic image cash letters ("ICLs") and items in the ICLs ("items" or "ICL items") during electronic check processing and using information collected during the monitoring process to locate errors where items have been duplicated for payment or presentment more than once.

The invention comprises a computer program that embodies the functions described herein and illustrated in the appended flow charts. However, it should be apparent that there could be many different ways of implementing the invention in computer programming, and the invention should not be construed as limited to any one set of computer program instructions. Further, a skilled programmer would be able to write such a computer program to implement an exemplary embodiment based on the flow charts and associated description in the application text. Therefore, disclosure of a particular set of program code instructions is not considered necessary for an adequate understanding of how to make and use the invention. The inventive functionality of the claimed computer program will be explained in more detail in the following description read in conjunction with the figures illustrating the program flow.

Turning now to the drawings, in which like numerals indicate like elements throughout the figures, exemplary embodiments of the invention are described in detail.

Figure 1:
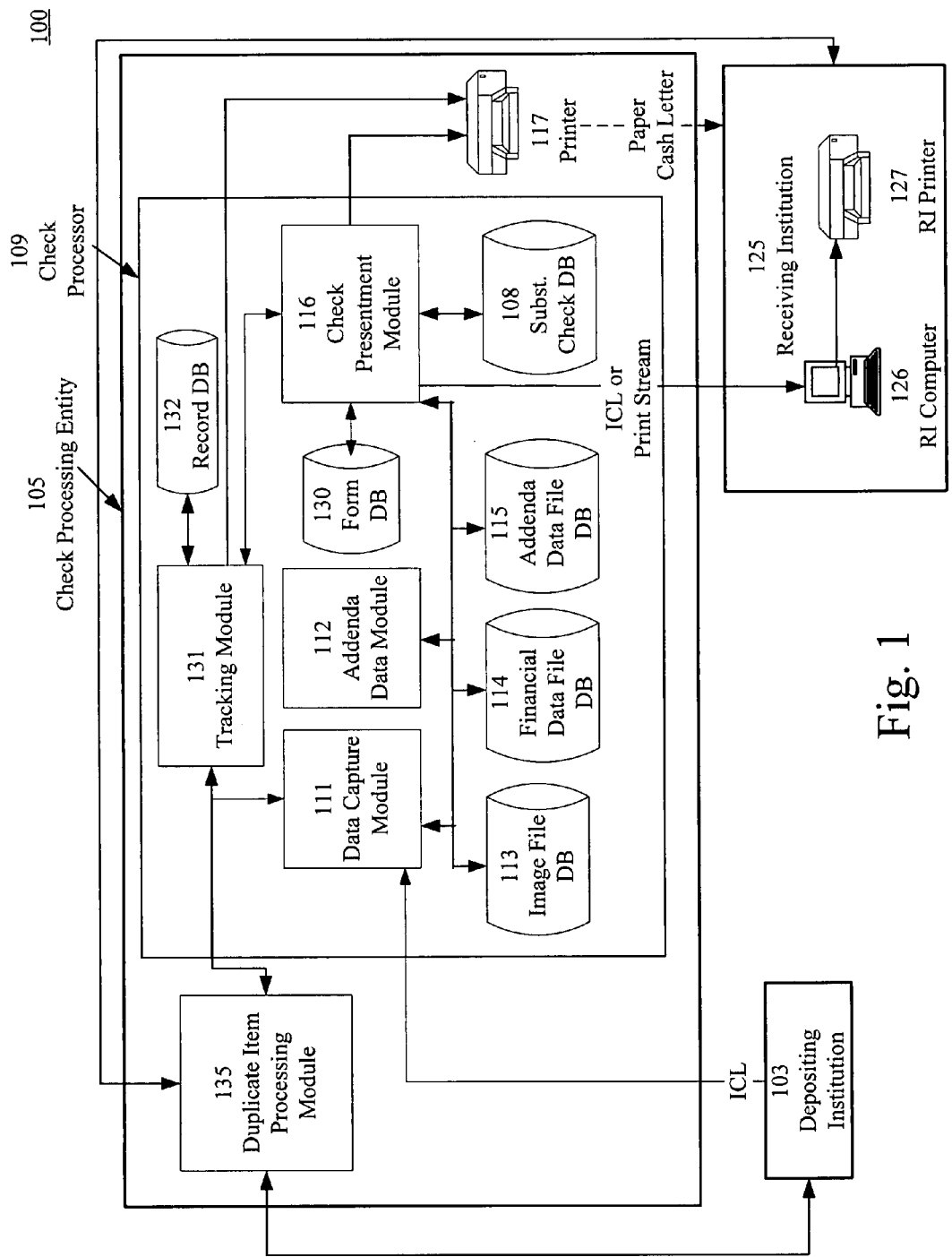
FIG. 1 is a block diagram depicting a system for electronic check processing in accordance with certain exemplary embodiments of the invention.
Figure 2:
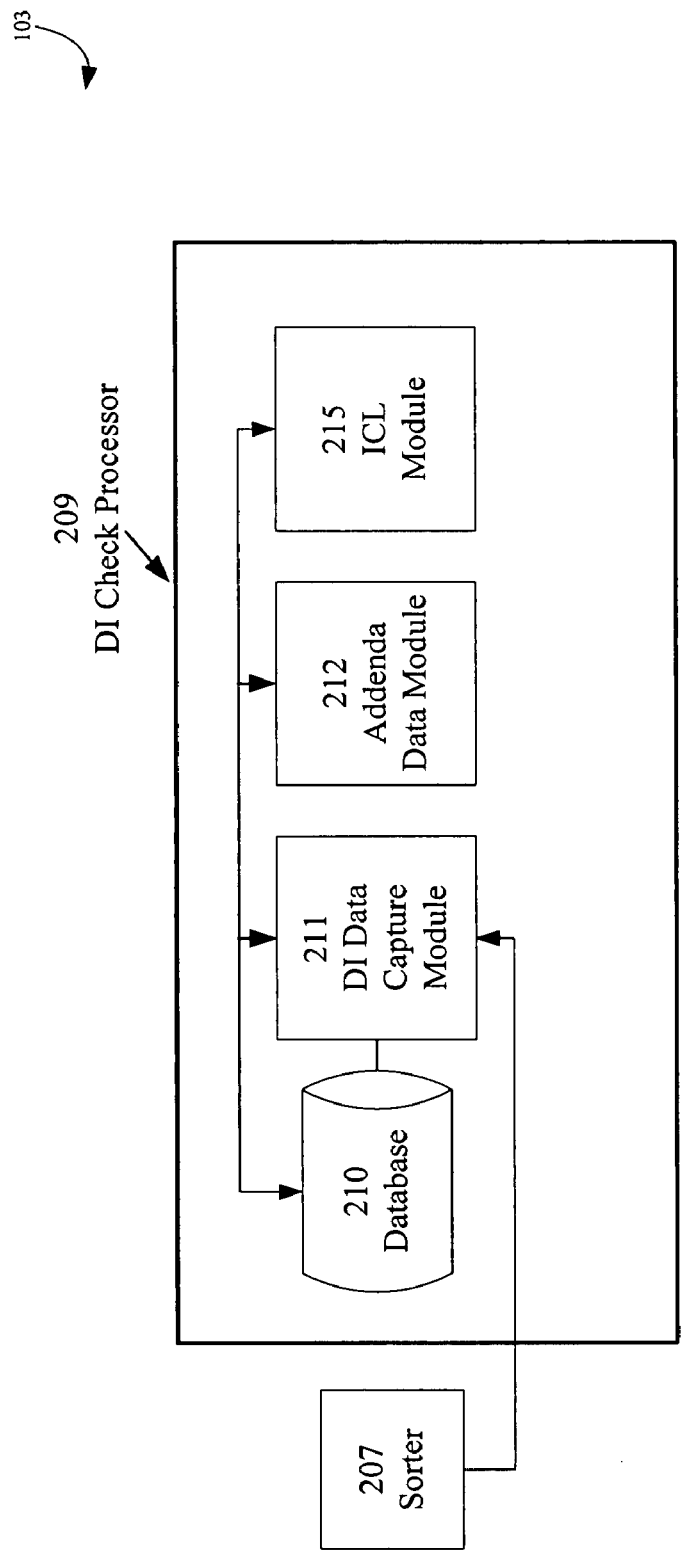
FIG. 2 is a block diagram depicting a system for electronic check processing in accordance with certain exemplary embodiments of the invention.

An exemplary system for processing checks will now be described with reference to FIGS. 1-2. FIG. 1 is a block diagram depicting a system 100 for processing checks, according to an exemplary embodiment. FIG. 2 is a block diagram depicting a depositing institution 103 of the system 100, according to an exemplary embodiment.

The system 100 comprises various financial institutions and computer systems involved in check processing. In particular, the system 100 comprises the depositing institution 103, a check processing entity 105, and a receiving institution 125. The depositing institution 103 collects paper checks from a customer. Then, the depositing institution 103 can bundle the paper checks in one or more paper cash letters. Each paper cash letter can comprise one or more bundles of original paper checks and paper image replacement documents, such as substitute checks. The depositing institution 103 forwards the paper checks to the check processing entity 105 via a paper cash letter for electronic processing.

Alternatively, the depositing institution 103 can itself generate an electronic image cash letter based on the paper checks. In this case, the depositing institution 103 can forward the generated ICL to the check processing entity 105 for electronic processing. The ICL can be an electronic file that complies with the American National Standards Institute Specifications for Electronic Exchange of Check and Image Data (ANSI X9.37/X9.100), or other appropriate industry standards, as may change from time to time. The ICL can comprise, for each paper check, one or more electronic images of the check, all of the complete MICR data provided on the check, and additional financial data related to the check.

The ICL can further comprise a series of records related to the checks. For example, for each bundle of checks in the ICL, the ICL can include a bundle summary control record comprising information about the bundle, such as a bundle identification number, the number of items in the bundle, the value of each of the checks in the bundle, and the total value of all the checks in the bundle. The ICL also can comprise an ICL control record comprising information about the origin and destination of the ICL, and a cash letter bundle summary control record comprising a summary of all bundle summary control records in the ICL.

Thus, in alternative embodiments of the invention, the depositing institution 103 can (1) forward received paper checks to the check processing entity 105; or (2) generate an ICL for received checks and forward the ICL to the check processing entity 105.

The following description discusses an exemplary embodiment in which the depositing institution 103 generates an ICL for received checks and forwards the ICL to the check processing entity 105. The depositing institution 103 processes the received paper checks at a sorter 207. The sorter 207 electronically captures information from each paper check. The sorter 207 comprises an image capture device (not shown), such as a scanner or camera, which captures at least one electronic image of each check. For example, the sorter 207 can capture, for each check, an image of the front of the check and an image of the back of the check.

Upon image capture, the sorter 207 forwards each image to a DI data capture module 211 of a DI check processor 209 for further processing. The DI data capture module 211 can store the electronic image(s) in one or more image files, which the DI data capture module 211 maintains in a database 210 of the DI check processor 209. In one exemplary embodiment, the sorter 207 and the DI data capture module 211 can be part of the same physical unit.

The sorter 207 further comprises a MICR reader (not shown) that reads the MICR data financial data from each check. Upon reading the MICR data, the sorter 207 identifies additional financial data related to the check, which is incidental to the processing of the check, and associates that information with the check image(s). For example, the sorter 207 can identify or assign a unique item sequence number, a check processing site identifier, a processing date, a check amount, and/or a routing transit number of the depositing institution 103. The sorter 207 forwards the financial data, including the MICR data and additional financial data, to the DI data capture module 211 for further processing.

The DI data capture module 211 stores a form financial data file with multiple fields. The DI data capture module 211 reads the financial data from the sorter 207 and parses and stores portions of the financial data in each of the data fields. The fields of the financial data file can comprise all of the MICR data from the original paper check. The DI data capture module 211 stores the financial data file in the database 210.

The DI check processor 209 further comprises an addenda data module 212, which generates and/or captures electronic addenda data for each check. For example, the addenda data can comprise a bank endorsement. The addenda data module 212 inputs the addenda data into one or more addenda data files. The addenda data module 212 stores the addenda data file(s) in the database 210.

For each check, the DI data capture module 211 associates the corresponding image file(s), financial data file, and addenda data file(s) for a check with a sequence number, identification number, or other suitable data link that uniquely identifies the check data.

The DI check processor 209 further comprises an ICL module 215, which generates at least one ICL comprising information regarding one or more bundles of checks. Each bundle can comprise one or more checks. For each check, the ICL can include the electronic image(s) from the check's image file(s), the financial data from the check's financial data file, and the addenda data from the check's addenda data file.

The ICL can further comprise a series of records related to the checks. For example, for each bundle of checks in the ICL, the ICL can include a bundle summary control record comprising information about the bundle, such as a bundle identification number, the number of items in the bundle, the value of each of the checks in the bundle, and the total value of all the checks in the bundle. The ICL also can comprise an ICL control record comprising information about the origin and destination of the ICL, and a cash letter bundle summary control record comprising a summary of all bundle summary control records in the ICL. The DI check processor 209 forwards the ICL to a data capture module 111 of a check processor 109 of the check processing entity 105 for further processing. The DI check processor 209 can forward the ICL to the data capture module 111 of the check processing entity 105 via an electronic ICL file. The electronic ICL file can comprise one or more ICLs.

Upon receiving the electronic ICL file, the data capture module 111 instructs a tracking module 131 of the check processor 109 to create an electronic cash letter record file for use in monitoring the processing status of each ICL and item contained in the electronic ICL file. The electronic cash letter record file comprises data fields configured to receive information regarding the electronic ICL file and each ICL and item contained therein. For example, the electronic cash letter record file can comprise a field in which the current processing status of an ICL/item can be stored. The tracking module 131 stores the electronic cash letter record file in a record database 132 of the check processor 109.

The tracking module 131 stores a record of receiving the electronic ICL file in the electronic cash letter record file. For example, the record can identify the electronic ICL file and associate a receipt indicator with the electronic ICL file. The record can identify the electronic ICL file by any identifying means, such as a total dollar amount of the ICLs contained within the electronic ICL file or the name and/or American Bankers Association ("ABA") routing number of the depositing institution 103 that transmitted the electronic ICL file to the data capture module 111. The receipt indicator can comprise any indicia indicating that the electronic ICL file was received by the data capture module 111. For example, the receipt indicator can comprise a simple, binary indicator. Alternatively, the receipt indicator can comprise the date and/or time at which the electronic ICL file was received by the data capture module 111.

Upon storing the record of receiving the electronic ICL file in the electronic cash letter record file, the tracking module 131 validates the contents and/or format of the electronic ICL file. For example, the tracking module 131 can determine whether each ICL in the electronic ICL file complies with the American National Standards Institute Specifications for Electronic Exchange of Check and Image Data (ANSI X9.37/X9.100), or other appropriate industry standards, as may change from time to time. The tracking module 131 also can evaluate each electronic check image in the ICLs to determine whether it meets particular quality standards. Certain exemplary systems and methods for performing such an evaluation are described in co-pending U.S. patent application Ser. No. 11/079,120, entitled "Assessing Electronic Image Quality," the disclosure of which is hereby fully incorporated herein by reference.

For example, the tracking module 131 can determine whether to accept or reject the electronic ICL file for processing based on the validation results. Similarly, the tracking module 131 can determine whether to accept or reject each ICL and/or item contained in the electronic ICL file based on the validation results. The tracking module 131 stores a record of the validation in the electronic cash letter record file. For example, the record of the validation can comprise a simple, binary indicator indicating that the validation was completed or failed to complete. Alternatively, the record of the validation can comprise detailed information regarding the validation completion and/or the results of the validation. For example, the record of the validation can comprise the date and/or time at which the validation was started, completed, and/or failed, the reason(s) that the validation failed, the results of the validation, and a reason for each validation result.

Upon validating the electronic ICL file, the check processor 109 separately processes each ICL and item contained in the electronic ICL file. For each ICL in the electronic ICL file, the tracking module 131 assigns a tracking number to the ICL and each of the items contained therein. In an exemplary embodiment, the same tracking number can be assigned to the ICL and each item in the ICL. In an alternative exemplary embodiment, different tracking numbers can be assigned to the ICL and each item in the ICL, with the tracking number for each item also identifying the ICL. The tracking number can be any unique indicia that can be used to identify the ICL and the items. For example, the tracking number can comprise any set of numbers, letters, symbols, or a combination thereof. The tracking module 131 can use the tracking number in monitoring the processing status of the ICL and the items. For example, the tracking module 131 can use the tracking number to identify certain records in the electronic cash letter record file regarding the processing status of the ICL and the items.

The tracking module 131 stores the tracking number in the electronic cash letter record file. For example, for each ICL, the tracking module 131 can store a record identifying the ICL and associating the tracking number with the ICL and the items contained therein. In one exemplary embodiment, the record can comprise a list of the items in the ICL. The record can identify, or otherwise be associated with, the electronic ICL file from which the ICL originated.

The tracking module 131 can further associate an incoming ICL value amount and an outgoing ICL value amount with each ICL. The incoming ICL value amount comprises the total value of the items in the received ICL. The outgoing ICL value amount comprises the total value of the items in the received ICL that have been presented in an outgoing ICL. Because none of the items in the received ICL will have been presented to a receiving institution 125 at the time the tracking module 131 first associates the value amounts with the ICL, the initial value of the outgoing ICL value amount is $0. As each item from the received ICL is presented to a receiving institution 125, the tracking module 131 can update the outgoing ICL value amount. Upon successful presentment of each item in the ICL, the outgoing ICL value amount should equal the incoming ICL value amount. The tracking module 131 can store the incoming ICL value amount and the outgoing ICL value amount in the electronic cash letter record file. Each value amount can be associated with the ICL and/or the ICL's tracking number in the electronic cash letter record file.

The tracking module 131 assigns a sequence number to each item in each ICL. For each item, the sequence number can comprise any unique indicia that can be used to identify the item. For example, the sequence number can comprise any set of numbers, letters, symbols, or a combination thereof. The tracking module 131 can store the sequence number in the electronic cash letter record file. For example, the tracking module 131 can store a record identifying the item and associating the sequence number with the item. The record can identify, or otherwise be associated with, the ICL, and/or the electronic ICL file, from which the item originated.

The tracking module 131 can use an item's sequence number in monitoring the processing status of the item. For example, the tracking module 131 can use the sequence number to identify certain records in the electronic cash letter record file related to the processing status of the item.

For each item in each ICL, the data capture module 111 reads the contents of the item and/or the contents of the ICL corresponding to the item and stores any electronic check image(s) corresponding to the item in one or more image files. The data capture module 111 maintains the image file(s) in an image file database 113 of the check processor 109. The tracking module 131 stores a record of the image file storage in the electronic cash letter record file. For example, the record of the image file storage can comprise a simple, binary indicator indicating that the image file storage was completed or failed to complete. Alternatively, the record of the image file storage can comprise detailed information regarding the image file storage, such as the date and/or time at which the image file storage occurred, the date and/or time at which the image file storage failed, the reason(s) for which the image file storage failed, and the name(s) of the stored image file(s).

For each item in each ICL, the data capture module 111 reads the contents of the item and/or the contents of the ICL corresponding to the item and stores financial data corresponding to the item in a financial data file. The data capture module 111 maintains the financial data file in a financial data file database 114 of the check processor 109. The tracking module 131 stores a record of the financial data file storage in the electronic cash letter record file in the record database 132. For example, the record of the financial data file storage can comprise a simple, binary indicator indicating that the financial data file storage was completed or failed to complete. Alternatively, the record of the financial data file storage can comprise detailed information regarding the financial data file storage, such as the date and/or time at which the financial data file storage occurred, the date and/or time at which the financial data file storage failed, the reason(s) for which the financial data file storage failed, and the name of the stored financial data file.

For each item in each ICL, an addenda data module 112 reads the contents of the item and/or the contents of the ICL corresponding to the item and stores addenda data corresponding to the item in one or more addenda data files. The addenda data module 112 maintains the addenda data file(s) in an addenda data file database 15 of the check processor 109. The tracking module 131 stores a record of the addenda data file storage in the electronic cash letter record file. For example, the record of the addenda data file storage can comprise a simple, binary indicator indicating that the addenda data file storage was completed or failed to complete. Alternatively, the record of the addenda data file storage can comprise detailed information regarding the addenda data file storage, such as the date and/or time at which the addenda data file storage occurred, the date and/or time at which the addenda data file storage failed, the reason(s) for which the addenda data file storage failed, and the name(s) of the stored addenda data file(s).

For each item in each ICL, the data capture module 111 associates the corresponding image file(s), financial data file, and addenda data file(s) for further processing. For example, the data capture module 111 can associate the image file(s), the financial data file, and the addenda data file(s) for the item with the item's sequence number or another suitable data link.

The check processor 109 further comprises a check presentment module 116, which is operable to present each received item to the receiving institution 125 for payment. The check presentment module 116 can generate a substitute check file for each item. In an exemplary embodiment, the substitute check file can comprise the electronic image(s), financial data, and addenda data corresponding to the item. The check presentment module 116 stores the substitute check file in a substitute check database 108 of the check processor 109.

The tracking module 131 stores a record of the substitute check file storage in the electronic cash letter record file. For example, the record of the substitute check file storage can comprise a simple, binary indicator indicating that the substitute check file storage was completed or failed to complete. Alternatively, the record of the substitute check file storage can comprise detailed information regarding the substitute check file storage, such as the date and/or time at which the substitute check file was created, the date and/or time at which the substitute check file storage occurred, the date and/or time at which the substitute check file creation/storage failed, the reason(s) for which the substitute check file creation/storage failed, and the name of the stored substitute check file. The tracking module 131 associates the record with the item in the electronic cash letter record file.

For each receiving institution 125, the check presentment module 116 creates at least one ICL comprising one or more substitute check files. The tracking module 131 stores a record of the ICL creation in the electronic cash letter record file. For example, the record of the ICL creation can comprise a simple, binary indicator indicating that the ICL was created or that the check presentment module 116 failed to create the ICL. Alternatively, the record of the ICL creation can comprise detailed information regarding the ICL creation, such as the date and/or time at which the ICL was created, the date and/or time at which the check presentment module 116 failed to create the ICL, and the reason(s) for which the check presentment module 116 failed to create the ICL. The tracking module 131 associates the record with each item included in the created ICL in the electronic cash letter record file.

The tracking module 131 aggregates the values of the items in the created ICL by tracking number. For each tracking number, the tracking module 131 adds the aggregated value to the outgoing ICL value amount corresponding to the tracking number. Thus, the outgoing ICL value amount will comprise the total value of the items received in the ICL associated with the tracking number that have been processed for presentment in the created, outgoing ICL. For example, the tracking module 131 can determine whether all the items in the ICL processed correctly based or whether the outgoing ICL value amount equals the incoming ICL value amount. If so, then all of the items processed correctly. If not, then at least one of the items has not finished processing or has not been processed correctly.

Depending on the preferences of the receiving institution 125, the check presentment module 116 can present the ICL electronically or via paper. For example, the check presentment module 116 can electronically transmit the ICL via a network (not illustrated) to an RI computer 126 of the receiving institution 125. Upon transmitting the ICL, the tracking module 131 stores a record of the ICL transmission in the electronic cash letter record file. For example, the record of the ICL transmission can comprise a simple, binary indicator indicating that the ICL was transmitted or that the check presentment module 116 failed to transmit the ICL. Alternatively, the record of the ICL transmission can comprise detailed information regarding the ICL transmission, such as the date and/or time at which the ICL was transmitted, the date and/or time at which the ICL failed to transmit, the reason(s) for which the ICL failed to transmit, and the name and/or ABA number of the receiving institution 125. The tracking module 131 associates the record with each item included in the transmitted ICL in the corresponding electronic cash letter record file.

Alternatively, the ICL can be locally or remotely printed for paper delivery. For example, the check presentment module 116 can locally print the ICL on a printer 117 of the check processing entity 105. In another example, the receiving institution 125 can print the ICL on an RI printer 127. In an exemplary embodiment, the check presentment module 116 can prepare a print stream comprising the ICL. Certain exemplary systems and methods for generating such a print stream are described in co-pending U.S. patent application Ser. No. 11/362,344, entitled "Cash Letter Print Streams with Audit Data," filed on Feb. 22, 2006, the disclosure of which is hereby fully incorporated herein by reference.

In an alternative exemplary embodiment, the tracking module 131 can maintain a single record for each ICL and/or each item in the electronic cash letter record file. The tracking module 131 can continuously update the single record to reflect the current processing status of the ICL/item. Thus, the current processing status of the ICL/item can be determined simply by reading the record in the electronic cash letter record file.

The tracking module 131 can monitor the processing status of each ICL and each item throughout the various stages of electronic check processing. It can read the records stored in the electronic cash letter record file to determine whether each ICL and item processed correctly, and if not, at which processing point it failed. In addition, it can balance each incoming ICL by determining whether each item in the incoming ICL has been presented in a corresponding, outgoing ICL.

For example, for a particular ICL, the tracking module 131 can read the incoming ICL value amount and the outgoing ICL value amount associated with the ICL in the electronic cash letter record file. If the amounts are equal, then all items in the ICL have been processed. If the amounts are not equal, then one or more of the items in the ICL have not been processed, have failed to process, or have been processed multiple times.

The tracking module 131 can determine the processing status of each item in the ICL by reviewing the electronic cash letter record file. For example, if no record corresponding to a particular item in the electronic cash letter record file indicates that a substitute check file corresponding to the item was included in an outgoing ICL file, then the tracking module 131 can determine that the item has not yet been fully processed. In addition, if multiple records corresponding to a particular item indicate that a substitute check file corresponding to the item was included in an outgoing ICL file, then the tracking module 131 can determine that the item has been processed multiple times.

In one exemplary embodiment, the tracking module 131 can generate one or more reports regarding the processing statuses of the ICLs/items. For example, the tracking module 131 can generate a report comprising the processing status of each item in an ICL. Alternatively, the tracking module 131 can generate a report comprising the processing status of each item that has failed to process, remains pending, or has been processed multiple times. For example, the report can comprise a list of each item that has failed to process, remains pending, or has been processed multiple times. The report can further comprise detailed information regarding the processing status of each item, such as the last processing step that the item completed, the date and/or time that the item completed its last processing step, the date and/or time that the item failed to complete a processing step, the reason(s) for which the item failed to complete a processing step, the date and/or time that the item was received (in the electronic ICL file) at the check processor 109, and/or the dollar value of the item.

In one exemplary embodiment, the report can comprise a summary of the processing statuses of all the items in an ICL. For example, the report can comprise a total number of items in the ICL, a total number of items in the ICL that have been processed, a total number of items in the ICL that have failed to process, a total number of items in the ICL that remain pending, and/or a total number of items in the ICL that have been processed multiple times.

The tracking module 131 can output each generated report. For example, the tracking module 131 can display a generated report on a monitor (not shown) or other display device. Alternatively, the tracking module 131 can print the generated report on the printer 117 of the check processing site.

Figure 3:
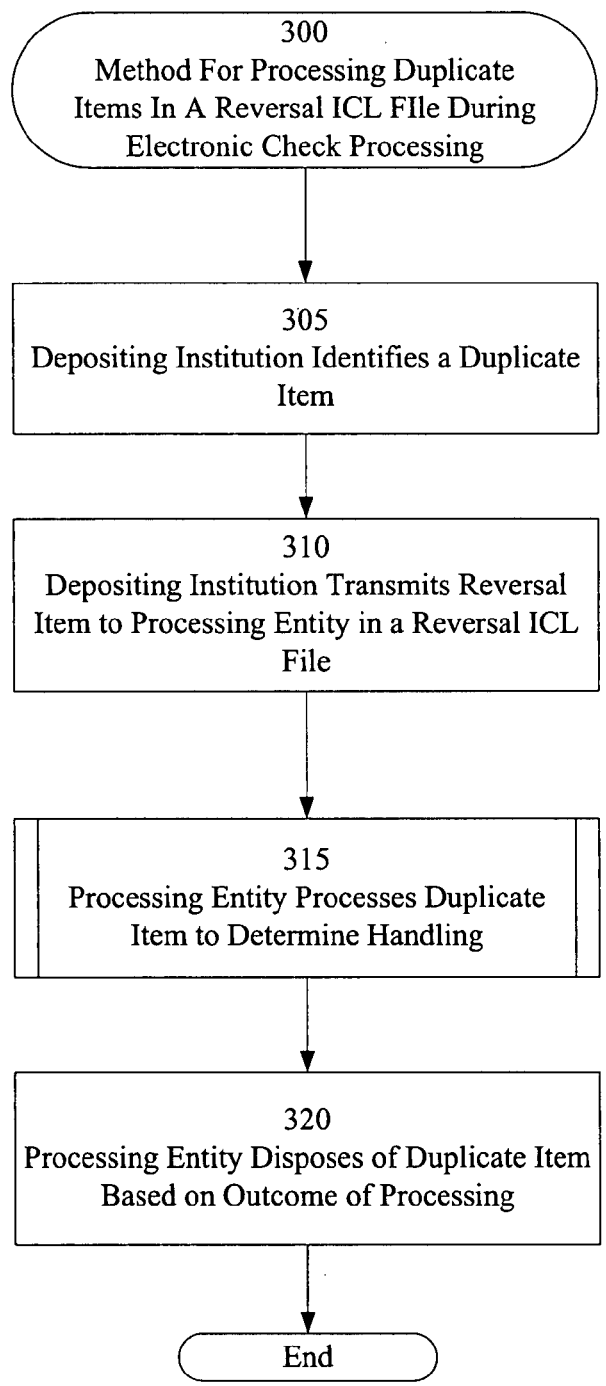
FIG. 3 is a flow chart diagram illustrating a method for processing reversal items associated with duplicative electronic checks according to certain exemplary embodiments of the invention.

Those skilled in the art will appreciate that exemplary system 100 is merely representative of the components for processing checks. Other embodiments of the invention may not have all of the components identified in FIGS. 1-2 or can include additional components FIG. 3 is a flow chart depicting a method 300 for processing duplicative electronic checks represented as items in a reversal ICL file, according to certain exemplary embodiments of the invention. The exemplary method 300 is illustrative and, in alternative embodiments of the invention, certain steps can be performed in a different order, in parallel with one another, or omitted entirely, and/or certain additional steps can be performed without departing from the scope and spirit of the invention. The method 300 is described below with reference to FIGS. 1 and 2.

In step 305, a depositing financial institution 103 identifies a duplicate item that has been deposited or presented for payment. For example, the depositing institution 103 may have identified the duplicate item as being included in multiple ICL files deposited with a check processing entity or the depositing financial institution 103 may have deposited the same ICL file twice. The ICL file is an electronic file that includes at least one ICL. For example, each ICL can be an electronic file that complies with the ANSI X9.37/X9.100 standard, or other appropriate industry standards, as may change from time to time. Each ICL includes one or more bundles of items (checks and/or IRDs) to be processed. For a particular item, the ICL can include one or more electronic images of the item, all of the complete MICR data provided on the item, and addenda data of the item.

The ICL also can include a series of records related to the items. For example, for each bundle of items in the ICL, the ICL can include a bundle summary control record including information about the bundle, such as a bundle identification number, the number of items in the bundle, the value of each of the items in the bundle, and the total value of all the items in the bundle. The ICL also can include an ICL control record containing information about the origin and destination of the ICL, and a cash letter bundle summary control record containing a summary of all the bundle summary control records in the ICL.

In certain embodiments of the invention, the ICL file also can include a file header including information identifying the depositing institution 103, such as a name of the depositing institution 103 and/or a bank routing number of the depositing institution 103. The file header also can include information regarding a creation date of the ICL file and information regarding whether each item in the ICL file is associated with a forward transaction or a return transaction.

For example, the depositing institution 103 can submit the ICL file to the check processing entity 105 via a network (not shown). The network can include any wired or wireless telecommunication means by which computerized devices can exchange data, including for example, a local area network (LAN), a wide area network (WAN), an intranet, an Internet, or any combination thereof.

In step 310, the depositing institution 103 places the duplicate item identified in step 305 in a reversal ICL file and deposits the reversal ICL file with the check processing entity 105. Typically, the header of the reversal ICL file will identify its contents as comprising one or more duplicate items that should be processed as a reversal. In step 315, the check processing entity 105 receives the reversal ICL file and identifies the reversal ICL file as comprising one or more duplicate items designated for reversal by examining the file's header. When a reversal ICL comprising one or more duplicate items designated for reversal is identified, the check processing entity 105 forwards the file to the duplicate item processing module 135.

The processing steps that the duplicate item processing module 135 undertakes assist the check processing entity 105 in identifying the reason the item has been identified as a duplicate for reversal. The techniques for determining the reason for the duplication can vary. The duplicate item processing module 135 can examine different records maintained at the check processing entity 105 in an attempt to determine the reason the depositing institution 103 identified the duplicate item and included it in a reversal ICL file. For example, the duplicate item processing module 135 can examine records of items previously deposited or presented to identify duplicate items matching the duplicate item in the reversal file. Examples of techniques for determining the reason for the duplication of the item are illustrated in greater detail in FIGS. 4A and 4B and will be discussed below in connection with that embodiment.

Determining the reason for the duplication of the item allows the check processing entity 105 to more efficiently correct errors created by the duplication and dispose of the reversal ICL file as illustrated in step 320. For example, if the depositing institution 103 erroneously deposited the item on more than one occasion, the check processing entity 105 can return the duplicate item to the depositing institution 103 for correction. Alternatively, if the check processing entity 105 is the source of the error, the check processing entity 105 can correct its own records, including making any necessary adjustment to settlement records. In connection with step 320, the check processing entity 105 also can notify the depositing institution 103 of its determination and disposition of the reversal ICL file.

Figure 4A:
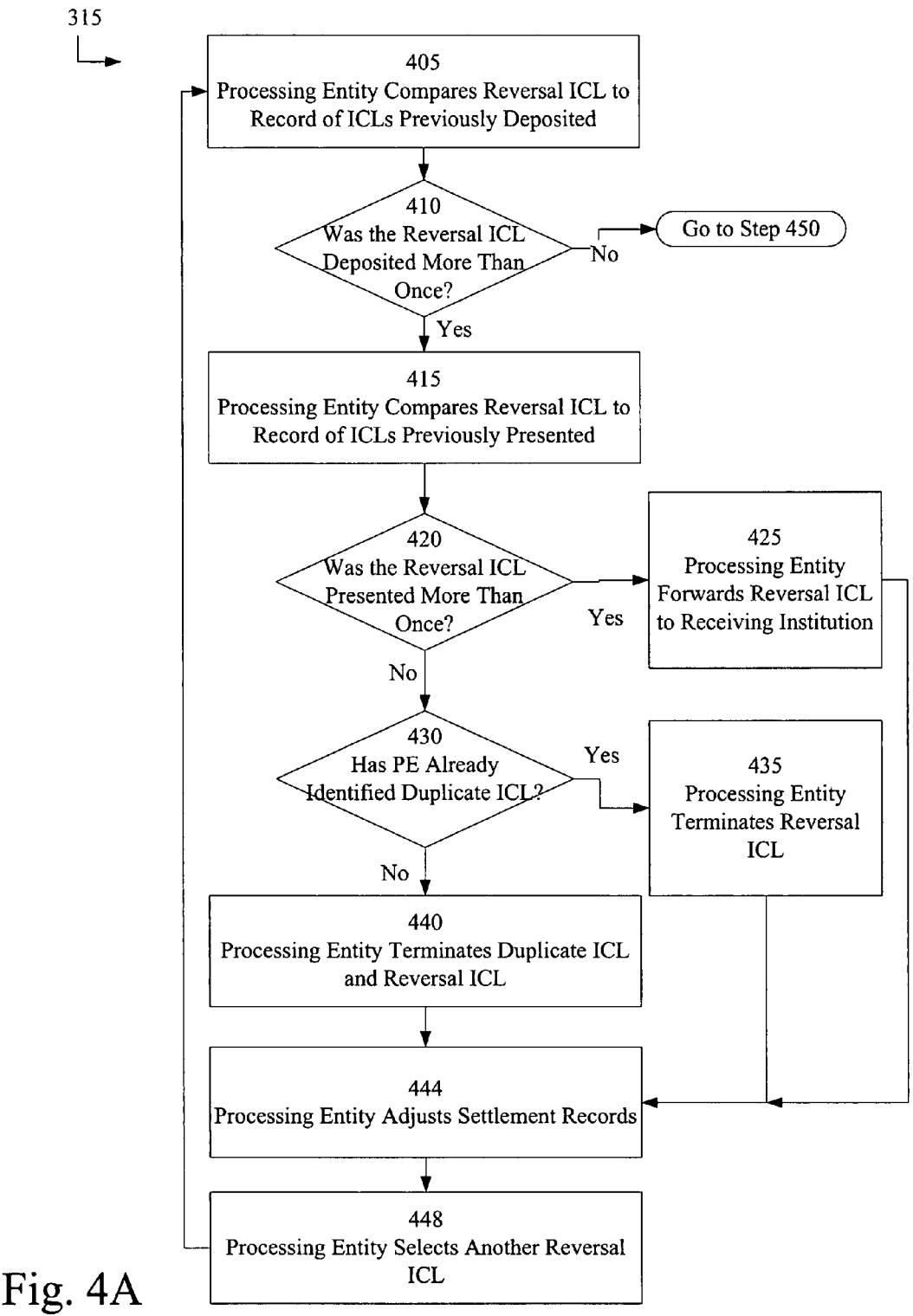
FIGS. 4A and 4B are flow chart diagrams illustrating a method for processing reversal items associated with duplicative electronic checks according to certain exemplary embodiments of the invention.
Figure 4B:
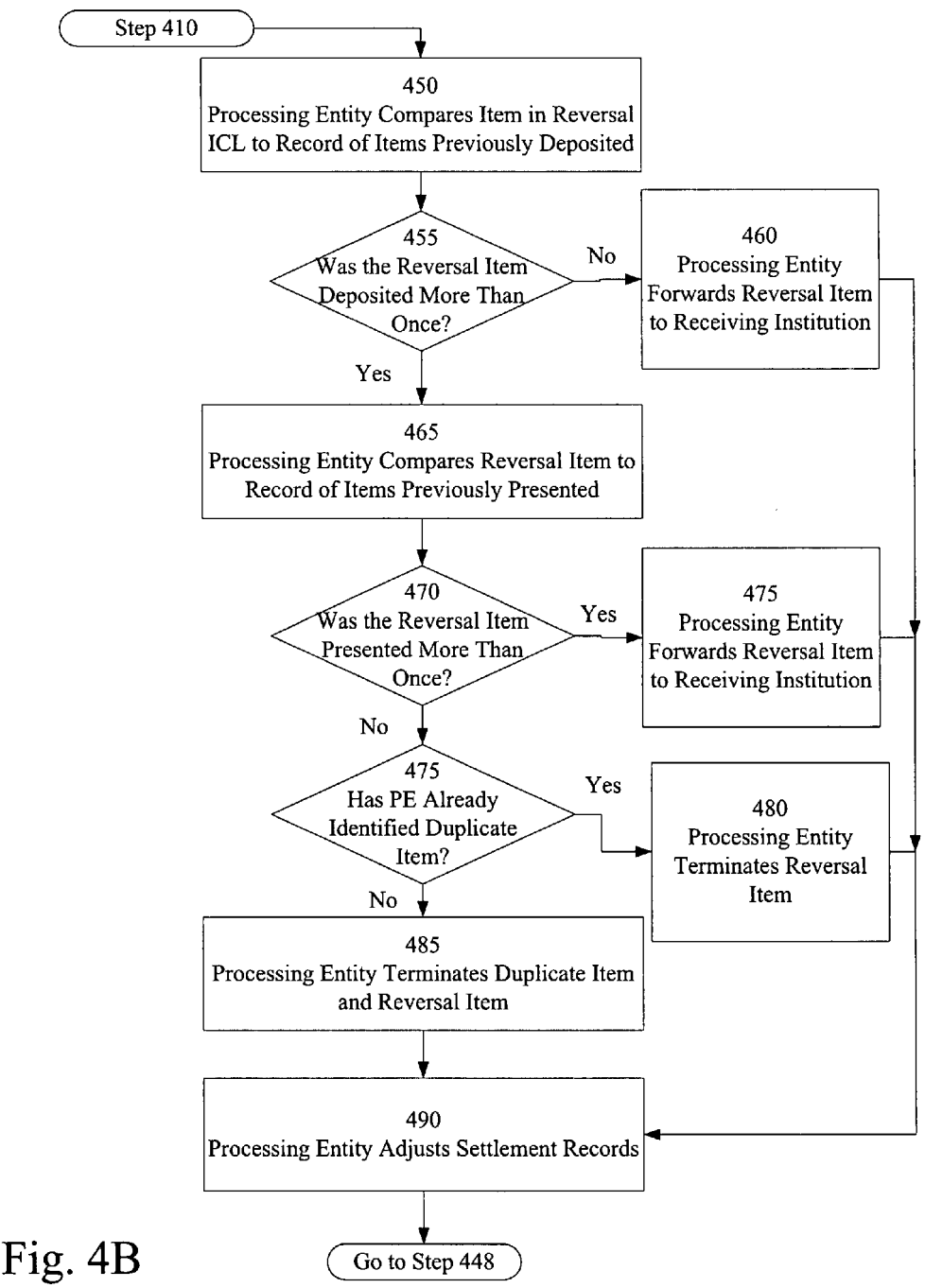

Referring to FIGS. 4A and 4B, an exemplary method 315 is illustrated for processing duplicate items to determine the reason for the duplication. The method 315 shown in FIGS. 4A and 4B is merely one example of a method for processing duplicate items and other methods may be used which fall within the scope of this invention. For example, the method shown in FIG. 4A includes a two-step comparison against the records of items previously presented to the receiving institution and against the records of items previously received from the depositing institution. In alternate embodiments, only one of these comparison steps may be employed to complete the processing. In yet other embodiments of the invention, a comparison against other types of information concerning the ICL items may be used to determine the reason for a duplication.

Turning to exemplary method 315 in FIG. 4A, in step 405 the check processing entity 105 can compare the reversal ICL file to the record of ICL files the depositing financial institution 103 previously deposited with the check processing entity 105. The check processing entity 105 can complete this comparison using the duplicate item processing module 135 and the tracking module 131. For example, the duplicate item processing module 135 can communicate with the tracking module 131 to search for records from the record database 132 that match the reversal ICL file. In step 410, if duplicates of the reversal ICL file are not identified in the record database 132, the exemplary method proceeds to step 450 of FIG. 4B for analysis of items with the reversal ICL file. Alternatively, if there is no record of previously receiving at least once the same ICL file as the reversal ICL file, the exemplary method 315 can proceed to step 450 for analysis of items within the reversal ICL file. Step 450 will be discussed in greater detail below in connection with FIG. 4B.

If in step 410 the check processing entity 105 determines that the reversal ICL file has been deposited more than once, the check processing entity 105 compares the reversal ICL file to the record of ICL files previously presented to the receiving financial institution 125. If the reversal ICL file in fact was presented more than once to the receiving institution 125, as determined in step 420, the check processing entity 105 forwards the reversal ICL file to the receiving institution 125 in step 425. The reversal ICL file will allow the receiving institution 125 to correct the previously presented duplicate ICL file and the process proceeds to step 444 where the check processing entity can adjust its settlement records to reflect the correction of the duplicate ICL file.

Referring again to step 420, if the records of the presented ICL files stored in record database 132 indicate that the reversal ICL file was not sent to the receiving institution multiple times, this may be an indication of two possible scenarios. First, the check processing entity 105 (or "PE") may have already detected the duplication of the ICL file. If this is the case, the exemplary method 315 proceeds from step 430 to step 435 and the check processing entity 105 terminates the reversal ICL file. The reversal ICL file is terminated in step 435 because the check processing entity 105 has already identified the duplication of the ICL file which renders the reversal ICL file unnecessary.

Under the second scenario posed by step 430, if the processing entity has not already identified the duplicate ICL file, the ICL file may be in the queue for processing at the check processing entity 105. In this second scenario, the exemplary process 315 proceeds to step 440 where the check processing entity 105 will locate and terminate the duplicate ICL file that is in the queue to be processed. In connection with step 440, the check processing entity 105 can also terminate the reversal ICL file as it is no longer necessary because the duplication has been identified and corrected.

Once the check processing entity 105 completes the termination of the reversal ICL file in either step 435 or 440, the exemplary method 315 proceeds to step 444 where the check processing entity 105 adjusts its settlement records to account for the correction of the duplicate ICL file. Once the handling of the duplicate ICL file is completed, the process moves to step 448 where another reversal ICL file is selected for processing.

Turning now to FIG. 4B, as referenced above, FIG. 4B illustrates part of exemplary method 315, but focuses on processing of items within a reversal ICL file. Proceeding from step 410 of FIG. 4A, in step 450 of FIG. 4B, the check processing entity 105 compares an item within the reversal ICL file to a record of items the depositing institution 103 previously deposited. The duplicate item processing module 135 can accomplish this comparison with the records of deposited items stored in record database 132. If the check processing entity 105 is not able to locate the reversal item as having been deposited more than once in step 455, then the check processing entity 105 likely will be unable to determine where the duplication of the item occurred. For example, the duplicate item could have been processed by another check processing entity and the check processing entity 105 would have no record of the duplicate processing. In this type of situation, the check processing entity 105 defers to the depositing institution's 103 decision to transmit the reversal item and the check processing entity 105 presents the reversal item to receiving institution 125 in step 460.

Referring again to step 455, if there is a record in record database 132 of the reversal item being deposited more than once, the exemplary method 315 proceeds to step 465 where the check processing entity 105 compares the record of items previously presented to the receiving institution 125. Duplicate item processing module 135 can perform this comparison using the records of items previously presented stored in record database 132. In step 470, if the reversal item was presented more than once, the check processing entity 105 forwards the reversal item to the receiving institution 125, in step 475, so that the duplication can be corrected. Once the reversal item is sent in step 475, the check processing entity 475 adjusts its settlement records in step 490.

Turning again to step 470, if the reversal item was not presented to the receiving financial institution 125 more than once, the exemplary method 315 proceeds to step 475. In step 475, the check processing entity 105 may identify one of two different situations. In the first situation, if the check processing entity 105 has previously identified the reversal item as a duplicate, then the check processing entity 105 has already fixed the error and the reversal item is terminated in step 480 because there is no need to send it to the receiving institution 125. Alternatively, in the second situation, the duplicate item may be waiting in a queue to be processed at the check processing entity 105 and has not yet been processed or identified as a duplicate. In this second situation, the check processing entity 105, in step 485, terminates the duplicate item so that the error is not propagated to the receiving institution 125 and also terminates the reversal item. In both steps 480 and 485, once the reversal item is terminated, the check processing entity 105 adjusts its settlement records in step 490 before returning to step 448. The foregoing process illustrated in FIG. 4B is an optional component of exemplary method 315 and provides the check processing entity 105 with the ability to more efficiently process reversal ICL files because it includes examination of the items with the reversal ICL file.

The invention can be used with computer hardware and software that performs the methods and processing functions described above. As will be appreciated by a person skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Although specific embodiments of the invention have been described above in detail, the description is merely for purposes of illustration. It should be appreciated, therefore, that many aspects of the invention were described above by way of example only and are not intended as required or essential elements of the invention unless explicitly stated otherwise. Various modifications of, and equivalent steps corresponding to, the disclosed aspects of the exemplary embodiments, in addition to those described above, can be made by a person skilled in the art without departing from the spirit and scope of the present invention defined in the following claims, the scope of which is to be accorded the broadest interpretation so as to encompass such modifications and equivalent structures.

We claim:

1. A computer-implemented method for a duplicate item processing module, installed on a computer and being executed by a processor, to process duplicate electronic checks, comprising the steps of:
    the duplicate item processing module electronically receiving from a depositing institution computing device a reversal image cash letter file comprising a reversal item, where the duplicate item processing module is located at a processing entity;
    the duplicate item processing module electronically comparing the reversal item to a record of previously deposited items received from the depositing institution computing device;
    if the reversal item does not match a plurality of items in the record of previously deposited items, the duplicate item processing module electronically forwarding the reversal item to a receiving institution;
    if the reversal item does match a plurality of items in the record of previously deposited items, the duplicate item processing module electronically comparing the reversal item to a record of items previously presented to a receiving institution computing device to determine whether an item matching the reversal item has been previously identified at the processing entity as a duplicate; and
        if the item matching the reversal item has been previously identified as a duplicate, the duplicate item processing module electronically terminating the reversal item; and
        if the item matching the reversal item has not been previously identified as a duplicate, the duplicate item processing module electronically forwarding the reversal item for sending to the receiving institution computing device.

2. The computer-implemented method of claim 1, wherein the reversal image cash letter file includes a designation indicating that it comprises at least one reversal item.

3. The computer-implemented method of claim 1, further comprising the step of the processing entity electronically notifying the depositing institution of the disposition of the reversal item.

4. A computer-implemented method for a duplicate item processing module, installed on a computer and being executed by a processor, to process duplicate electronic checks comprising the steps of:
    the duplicate item processing module electronically receiving at a processing entity a reversal file comprising a reversal item from a depositing institution;
    the duplicate item processing module electronically comparing the reversal file to a record of previously deposited files;
    if the reversal file does not match a plurality of files in the record of deposited files, the duplicate item processing module electronically forwarding the reversal file for sending to a receiving institution;
    if the reversal file does match a plurality of files in the record of deposited files, the duplicate item processing module electronically comparing the reversal file to a record of files previously presented to a receiving institution computing device to determine whether a file matching the reversal file has been previously identified at the processing entity as a duplicate; and
        if the file matching the reversal file has been previously identified as a duplicate, the duplicate item processing module electronically terminating the reversal file; and
        if the file matching the reversal file has not been previously identified as a duplicate, the duplicate item processing module electronically forwarding the reversal file for sending to the receiving institution computing device.

5. The computer-implemented method of claim 4, wherein the reversal file includes a designation indicating that it is a reversal file.

6. The computer-implemented method of claim 4, further comprising the step of the processing entity electronically notifying the depositing institution of the disposition of the reversal file.

7. A computer-implemented system for processing duplicate electronic checks, comprising:
    a check processing system operable for processing items in an image cash letter file for payment or presentment to a receiving institution computing device, the check processing system comprising a first database of records of items previously presented to the receiving institution computing device and a second database of records of items previously deposited with the check processing system for processing;
    a duplicate item processing module operable for receiving from a depositing institution computer a reversal image cash letter file comprising a reversal item and for comparing the reversal item to the first database of records of items previously presented and the second database of records of items previously deposited with the check processing system for processing;
    the duplicate item processing module further operable such that,
    if the reversal item matches a plurality of items in the second database of records, the duplicate item processing module electronically compares the reversal item to the first database of records to determine whether an item matching the reversal item has been previously identified at the processing entity as a duplicate; and
        if the item matching the reversal item has been previously identified as a duplicate, the duplicate item processing module electronically terminating the reversal item; and
        if the item matching the reversal item has not been previously identified as a duplicate, the duplicate item processing module electronically forwarding the reversal item for sending to the receiving institution computing device.

8. The computer-implemented system of claim 7 wherein the items in the second database of records of items previously deposited with the check processing system for processing were received from a depositing institution computer.

* * * * *